United States Patent
Matsuka et al.

(10) Patent No.: US 11,073,527 B2
(45) Date of Patent: Jul. 27, 2021

(54) AUTOMATED SAMPLE INSPECTION SYSTEM AND METHOD FOR CONTROLLING SAME

(71) Applicant: Hitachi High-Technologies Corporation, Tokyo (JP)

(72) Inventors: Takeshi Matsuka, Tokyo (JP); Shigeru Yano, Tokyo (JP); Masaki Chikahisa, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 299 days.

(21) Appl. No.: 16/313,481

(22) PCT Filed: Jul. 14, 2017

(86) PCT No.: PCT/JP2017/025815
§ 371 (c)(1),
(2) Date: Dec. 27, 2018

(87) PCT Pub. No.: WO2018/034095
PCT Pub. Date: Feb. 22, 2018

(65) Prior Publication Data
US 2019/0170780 A1 Jun. 6, 2019

(30) Foreign Application Priority Data
Aug. 18, 2016 (JP) .............................. JP2016-160887

(51) Int. Cl.
*G01N 35/04* (2006.01)
*G01N 35/02* (2006.01)

(52) U.S. Cl.
CPC ............. *G01N 35/04* (2013.01); *G01N 35/02* (2013.01); *G01N 35/021* (2013.01);
(Continued)

(58) Field of Classification Search
CPC ............... G01N 35/04; G01N 35/02; G01N 2035/0406; G01N 2035/0401;
(Continued)

(56) References Cited

U.S. PATENT DOCUMENTS

2013/0197690 A1 8/2013 Suxuki et al.
2014/0079527 A1* 3/2014 Takai ..................... G01N 35/04
414/807

(Continued)

FOREIGN PATENT DOCUMENTS

JP 2012-184977 A 9/2012
JP 2016-138811 A 8/2016
(Continued)

OTHER PUBLICATIONS

International Search Report of PCT/JP2017/025815 dated Sep. 19, 2017.
(Continued)

*Primary Examiner* — Jill A Warden
*Assistant Examiner* — John McGuirk
(74) *Attorney, Agent, or Firm* — Mattingly & Malur, PC

(57) ABSTRACT

An automated sample inspection system is provided with a conveyance line for conveying sample carriers; an empty sample carrier line for conveying empty sample carriers; and a buffer line for temporarily holding empty sample carriers supplied from the empty sample carrier line to the conveyance line. According to the depletion status of the buffer line of each processing system, and the depletion status of other processing systems adjacent to each processing system, the number of empty sample carriers to be conveyed from the empty sample carrier line to the buffer line of each processing system, and the number of empty sample carriers to be conveyed from the empty sample carrier line of each processing system to the empty sample carrier line of another
(Continued)

adjacent processing system are determined. Consequently, delays in the processes in the system can be suppressed due to the suppression of the depletion of sample carriers.

2 Claims, 3 Drawing Sheets

(52) U.S. Cl.
CPC ............... *G01N 2035/0406* (2013.01); *G01N 2035/0424* (2013.01); *G01N 2035/0462* (2013.01)

(58) Field of Classification Search
CPC ... G01N 2035/0424; G01N 2035/0462; G01N 35/026; G01N 2035/0472; G01N 35/00584; G01N 2035/0094; G01N 2035/0465
See application file for complete search history.

(56) References Cited

U.S. PATENT DOCUMENTS

| | | | |
|---|---|---|---|
| 2014/0208872 | A1 | 7/2014 | Yasuzawa et al. |
| 2016/0231343 | A1* | 8/2016 | Yan ........................ B65G 37/00 |
| 2016/0252539 | A1 | 9/2016 | Sasaki et al. |

FOREIGN PATENT DOCUMENTS

| | | |
|---|---|---|
| WO | 2012/043261 A1 | 4/2012 |
| WO | 2013/042549 A1 | 3/2013 |
| WO | 2015/093354 A1 | 6/2015 |

OTHER PUBLICATIONS

International Preliminary Report on Patentability received in corresponding International Application No. PCT/JP2017/025815 dated Feb. 28, 2019.

* cited by examiner

[FIG. 1]
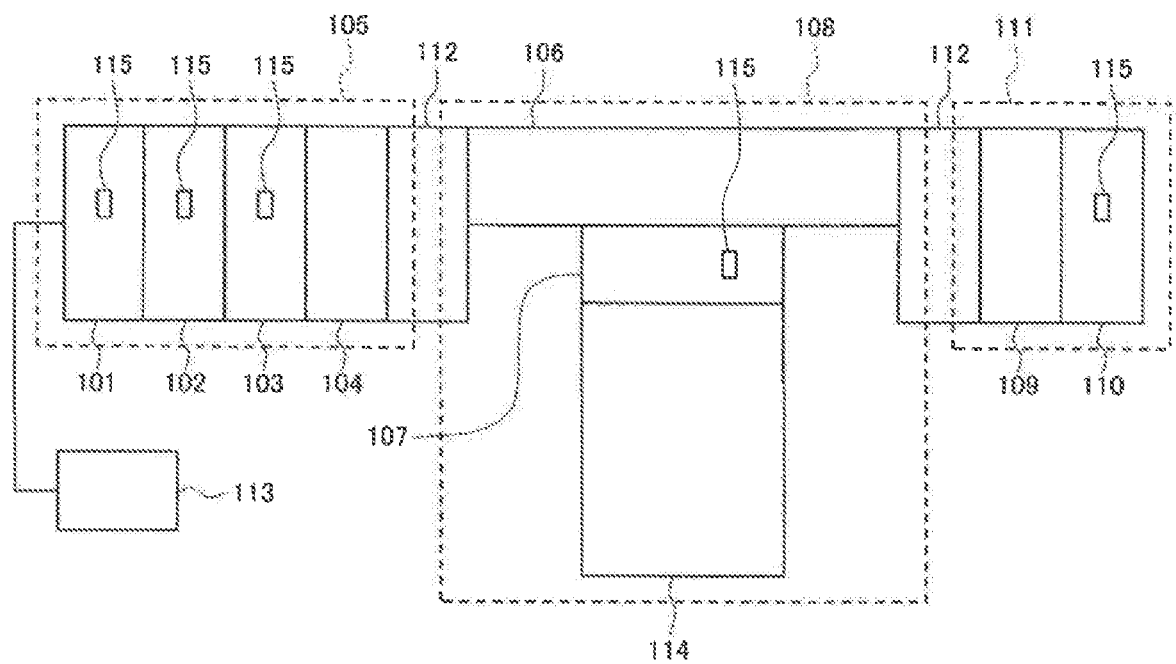
[FIG. 2]
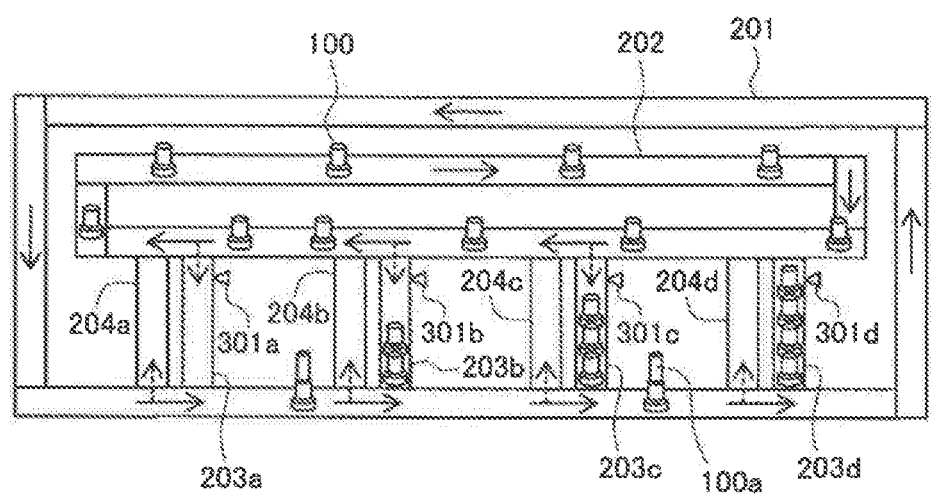

[FIG. 3]
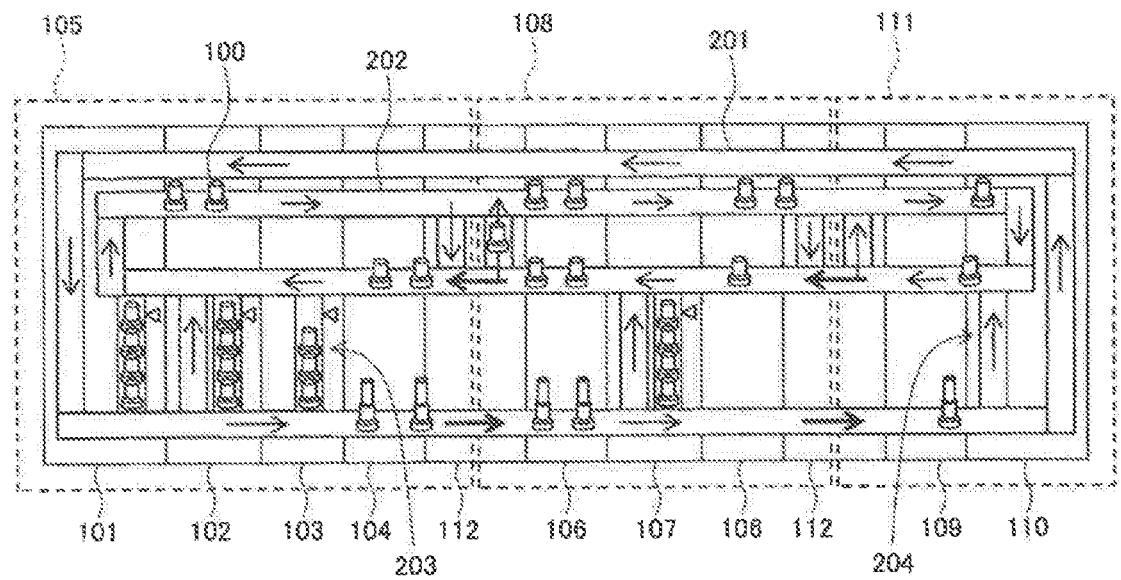
[FIG. 4]
|  |  | OWN SYSTEM ||
|---|---|---|---|
|  |  | DEPLETION | NORMAL |
| ADJACENT SYSTEM | DEPLETION | 3 | 6 |
|  | NORMAL | NOT SUPPLY | 3 |
| BUFFER | DEPLETION | 1 | 2 |
|  | NORMAL | NOT SUPPLY | 1 |
|  | FULL | NOT SUPPLY | NOT SUPPLY |

[FIG. 5]
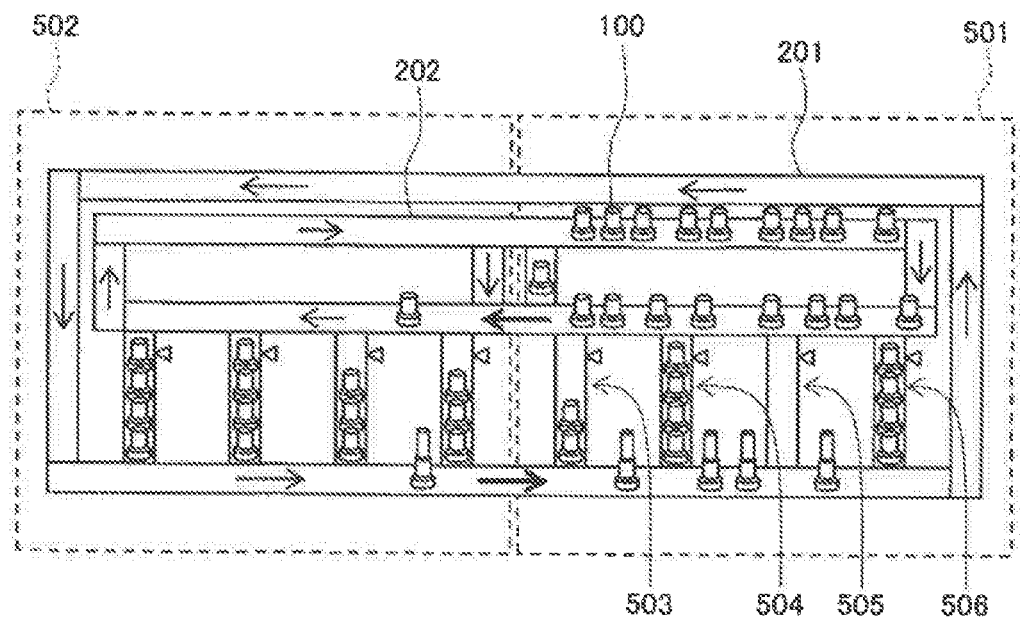
[FIG. 6]
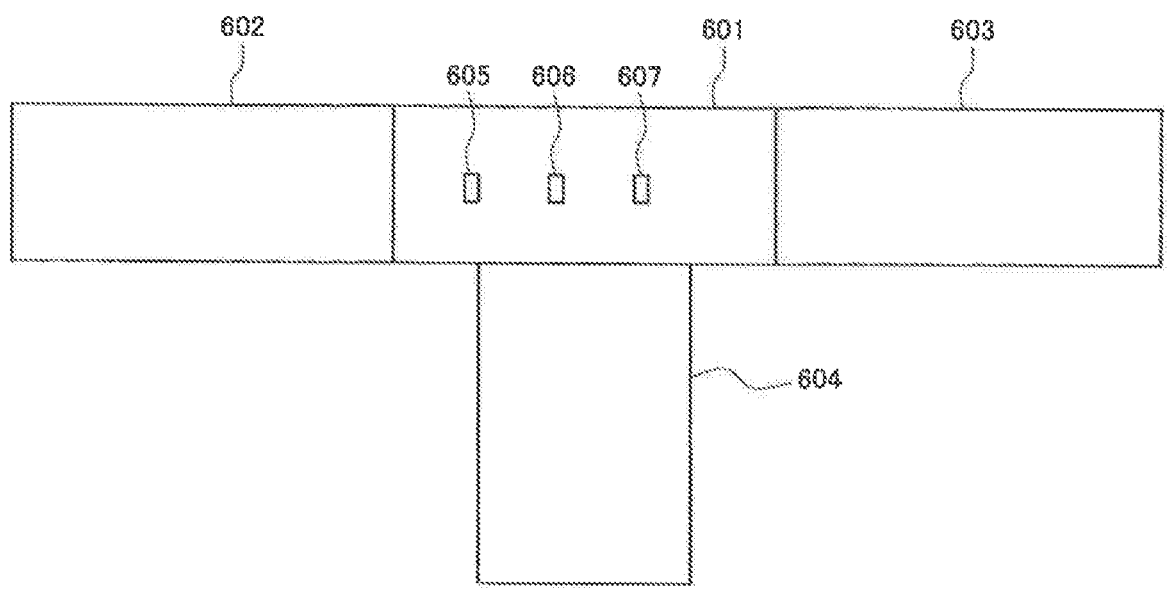

AUTOMATED SAMPLE INSPECTION SYSTEM AND METHOD FOR CONTROLLING SAME

TECHNICAL FIELD

The present invention relates to an automated sample inspection system that performs quantitative and qualitative analysis of specific ingredients contained in a sample such as blood or urine.

BACKGROUND ART

In an automated sample inspection system that performs quantitative and qualitative analysis of specific ingredients contained in a sample by using a reagent and a biological sample (hereinafter referred to as a sample) such as blood or urine, it is necessary to convey sample containers accommodating the sample between a plurality of preprocessing modules that perform preprocessing to make the sample into an analyzable state and an analysis device that analyzes the sample.

As a technique related to such conveyance of sample containers, for example, Patent Literature 1 (WO2012/043261) discloses a method for controlling an automated sample inspection system that includes a sample conveyance line which conveys a sample rack holding a sample to a processing unit; and an empty sample rack stock part which stocks a sample rack not holding a sample, in which an empty sample rack is controlled to be conveyed from the empty sample rack stock part to the sample conveyance line or the processing unit. Further, Patent Literature 2 (WO2015/093354) discloses a connection unit that includes a first conveyance line which conveys a sample rack holding a sample in a first direction; a second conveyance line which conveys a sample rack holding a sample in a second direction opposite to the first direction; a first connection bypass which connects the first conveyance line and the second conveyance line, and conveys the sample rack holding the sample in a third direction; and a second bypass which connects the first conveyance line and the second conveyance line, and conveys the sample rack holding the sample in a fourth direction opposite to the third direction, in which the first conveyance line, the second conveyance line, and the first connection bypass forms a first loop structure, and the first conveyance line, the second conveyance line, and the second connection bypass forms a second loop structure.

PRIOR ART LITERATURE

Patent Literature

PTL 1: WO2012/043261
PTL 2: WO2015/093354

SUMMARY OF INVENTION

Technical Problem

In the related art described in Patent Literature 1, a sample rack acquisition ratio for a plurality of processing units configuring the automated sample inspection system is determined based on the number of the processing units in need of a supply of an empty sample rack and an order in which empty sample racks arrived. However, a processing speed and a processing status are different in each processing unit, and the number of required empty sample racks and a priority are also different for each processing unit. Thus, it is impossible to properly control the number and a conveyance destination of sample racks to be conveyed, and depletion of the sample racks is not suppressed sufficiently. Further, in the related art described in Patent Literature 2, empty racks are mutually supplied between a plurality of systems connected by the connection unit as needed. However, specific contents of how to supply the empty racks are not disclosed and depletion of the sample racks is not suppressed sufficiently.

The invention has been made in view of the above-described problem, and an object thereof is to provide an automated sample inspection system in which delays in processes in the system can be suppressed due to the suppression of depletion of the sample carriers and a method for controlling the same.

Solution to Problem

In order to achieve the object, the invention provides an automated sample inspection system that includes a plurality of processing systems which are arranged adjacently to each other and each including one or more processing units that perform processing according to an analysis of a sample and includes a conveyance line that is able to convey sample containers accommodating samples and mounted on sample carriers in each of the processing systems and convey to another adjacent processing system; an empty sample carrier line that is able to hold while conveying empty sample carriers on which the sample container is not mounted in each of the processing systems and convey to another adjacent processing system; a buffer line that temporarily holds the empty sample carriers supplied from the empty sample carrier line to the conveyance line; a control device that determines the number of the empty sample carriers to be conveyed from the empty sample carrier line to the buffer line of each of the processing systems and the number of the empty sample carriers to be conveyed from the empty sample carrier line of each of processing systems to the empty sample carrier line of another adjacent processing system in accordance with a depletion status of the empty sample carriers held in the buffer line of each of processing systems and a depletion status of empty sample carriers held by another processing system adjacent to each processing system.

Advantageous Effect

According to the invention, delays in the processes in the system can be suppressed due to the suppression of depletion of the sample carriers.

BRIEF DESCRIPTION OF DRAWINGS

FIG. 1 is a diagram roughly showing an overall configuration of an automated sample inspection system.

FIG. 2 is a diagram explaining a part extracted from a function of conveying sample containers and sample carriers in the automated sample inspection system.

FIG. 3 is a diagram schematically showing an example of a conveyance of the sample containers and the sample carriers in the automated sample inspection system.

FIG. 4 is a diagram showing an example of a supply coefficient table.

FIG. 5 is a diagram showing an example of a conveyance process.

FIG. 6 is a diagram showing an example of a conveyance process in a larger-scale processing system.

DESCRIPTION OF EMBODIMENTS

An embodiment of the invention will be described with reference to drawings.

FIG. 1 is a diagram roughly showing an overall configuration of an automated sample inspection system according to the present embodiment.

In FIG. 1, the automated sample inspection system includes a plurality of processing systems which are arranged adjacently to each other, and each processing system includes one or more processing units that perform processing according to the analysis of a sample. The automated sample inspection system roughly includes a processing system 105 which includes a feeding unit 101 that feeds a sample accommodated in a sample container 100a (see FIG. 2) (hereinafter, simply referred to as a sample) to provide on a sample carrier 100 (see FIG. 2), a centrifugal unit 102 that centrifuges the sample, a labeler 103 that prepares and attaches an identification mark (a bar code or the like) to an empty sample container 100a to which a small part of the sample is to be dispensed, and a dispensing unit 104 that opens the fed sample container 100a and dispenses a part of the sample into the sample container 100a prepared by the labeler 103; a processing system 108 which includes a conveyance unit 106 that conveys the sample container 100a mounted on the sample carrier 100 and empty sample carriers 100, and a transfer unit 107 that transfers the sample container 100a mounted on the sample carrier 100 to a sample rack (not shown) used for conveying an sample container 100a in an analyzer 114 so as to be conveyed to the analyzer 114; a processing system 111 which includes a plugging unit 109 that stops (plugs) the processed sample container 100a by plugging, and a storage unit 110 that stores the plugged sample container 100a in a storage tray (not shown) for storing from the sample carrier 100; a connection unit 112 that connects the processing systems 105, 108, and 111; and a control device that controls all operation of the automated sample inspection system.

FIG. 3 is a diagram schematically showing an example of a conveyance of the sample containers and the sample carriers in the automated sample inspection system. In addition, FIG. 2 is a diagram explaining a part extracted from a function of conveying the sample containers and the sample carriers in the automated sample inspection system.

As shown in FIG. 2 and FIG. 3, the automated sample inspection system includes a conveyance line 201 that can convey the sample containers 100a accommodating samples and mounted on the sample carriers 100 to each processing unit in each of the processing systems 105, 108, and 111, and to another adjacent processing system 105, 108, or 111; an empty sample carrier line 202 that can hold while conveying and circulating empty sample carriers 100 on which the sample container 100a is not mounted in each of the processing systems 105, 108, and 111, and convey (supply) to another adjacent processing system 105, 108, or 111; one or more buffer lines 203a to 203d (hereinafter, the plurality of constituent elements may be collectively referred to as "buffer line 203") that temporarily hold empty sample carriers 100 supplied from the empty sample carrier line 202 to the conveyance line 201; and one or more recycle lines 204a to 204d (hereinafter, the plurality of constituent elements may be collectively referred to as "recycle line 204") that recycle empty sample carriers 100 from the conveyance line 201 to the empty sample carrier line 202. The buffer line 203 is arranged as a buffer 115 for storing empty sample carriers 100 in a certain processing unit required for providing the sample container 100a on the sample carrier 100. A branching point of each line has a mechanism that switches a traveling direction of the sample carrier 100 based on the control of a control device 113, and an illustration thereof is omitted. In addition, a stopper or the like that switches between whether or not to move the sample carrier 100 from the buffer line 203 to the conveyance line 201 based on the control of the control device 113 is disposed at a connection portion between the buffer line 203 and the conveyance line 201, and an illustration thereof is omitted.

The sample container 100a fed from the feeding unit 101 is mounted on the empty sample carrier 100 supplied from the buffer line 203 of the feeding unit 101 and conveyed to the centrifugal unit 102. The sample container 100a is removed from the sample carrier 100 by the centrifugal unit 102 and is provided in a centrifuge, and an emptied sample carrier 100 is recycled to the empty sample carrier line 202 via the recycle line 204 of the centrifugal unit 102. The sample container 100a subjected to a centrifugal process by the centrifugal unit 102 is mounted on the empty sample carrier 100 supplied from the buffer line 203 of the centrifugal unit 102, and is conveyed to the dispensing unit 104 via the labeler 103. At this time, one or more (for example one) empty sample containers 100a (a sub-sample container) for dispensing are prepared in the labeler 103, and are mounted on the empty sample carriers 100 supplied from the buffer line 203 of the labeler 103 so as to be conveyed to the dispensing unit 104. In the dispensing unit 104, the sample is dispensed from the sample container 100a subjected to the centrifugal process into the sub-sample container, and then is separately conveyed to the transfer unit 107 via the connection unit 112 and the conveyance unit 106. At this time, it is recognized that a plurality of (for example, two) sample carriers are conveyed from the processing system 105 to the processing system 108. The sample container 100a arrived at the transfer unit 107 is transferred to another carrier (the sample rack, not shown) used for conveying in the analysis device 114. The emptied sample carrier 100 is conveyed to the empty sample carrier line 202 via the recycle line 204 of the transfer unit 107. The sample provided on the sample rack is conveyed to the analysis device 114 so as to be analyzed, and then may return to the transfer unit 107 again. At this time, an empty sample carrier 100 is supplied from the buffer line 203 of the transfer unit 107, and the sample container 100a returned from the analysis device 114 is transferred to the sample carrier 100. The sample container 100a transferred to the sample carrier 100 is conveyed to the plugging unit 109 via the conveyance unit 106 and the connection unit 112. At this time, it is recognized that the sample carrier 100 is conveyed from the processing system 108 to the processing system 111. The sample container 100a plugged by the plugging unit 109 is conveyed to the storage unit 110 in a state of being mounted on the sample carrier 100. In the storage unit 110, the sample container 100a is removed from the sample carrier 100 and stored in a storage tray or the like (not shown), and the emptied sample carrier 100 is conveyed to the empty sample carrier line 202 via the recycle line 204 of the storage unit 110.

The empty sample carriers 100 are circulated by the empty sample carrier line 202 in each of the processing systems 105, 108, and 111. In each of the processing systems 105, 108, and 111, an empty sample carrier 100 is supplied from the empty sample carrier line 202 to a buffer line 203 when the buffer line 203 is no longer full. Further, when the sample carrier 100 is conveyed between the processing systems 105, 108, and 111 in the conveyance line 201, in order to maintain a constant number of sample carriers 100 held in each of the processing systems 105, 108, and 111, the empty sample carrier 100 is conveyed in an opposite direction (the direction that counteracts a change in the number of the sample carriers 100 in each processing system caused by the movement of the sample carrier 100 between the processing systems in the conveyance line 201) by the empty sample carrier line 202.

Here, the conveyance process of the sample containers 100a mounted on the sample carriers 100 and the empty sample carriers 100 by the control device 113 will be described.

First, a depletion status used in the conveyance process of the present embodiment will be described. The depletion status indicates a degree relative to a required number of empty sample carriers 100 in each processing unit or processing system, and is defined for the buffer line 203 (the buffer 115) and the processing systems 105, 108, and 111, respectively.

In the buffer line 203, the depletion status is defined in which a state where the buffer line 203 is filled with a predetermined maximum holding number of empty sample carriers 100 is defined as a full state (see the buffer line 203d in FIG. 2), a state where a number of the held empty sample carriers 100 is smaller than that in the full state is defined as a normal state (see the buffer lines 203b and 203c in FIG. 2), and a state where there is no empty sample carrier 100 being held is defined as a depletion state (see the buffer line 203a in FIG. 2), for example.

In the present embodiment, which state of the depletion status each buffer line 203 is in is determined as follows. First, a status of the empty sample carriers 100 on the buffer line 203 is ascertained by using sample carrier detection sensors 301a to 301d (hereinafter, the plurality of constituent elements are collectively referred to as "sample carrier detection sensor 301") in a full position of each buffer line 203 (that is, a position that detects the presence or absence of a sample carrier 100 which is positioned on the most upstream side when each buffer line 203 becomes the full state). For example, detection results of the sample carrier detection sensor 301 is checked once at every predetermined time interval (for example, 10 seconds); the depletion state is determined in a case where the number of times of ON (that is, when the sample carrier 100 is detected) in the past 100 check results is equal to or less than a predetermined number of times (for example, 10 times), the normal state is determined in a case where the number of times of ON is within a predetermined range of number of times (for example, 11 to 99 times), and the full state is determined in a case where the number of times of ON is 100 times. The method for ascertaining the status of the empty sample carriers 100 is not limited as described above. For example, the status may also be calculated based on the number of the empty sample carriers 100 supplied from the buffer line 203 to the conveyance line 201 and the number of the empty sample carriers 100 supplied from the empty sample carrier line 202 to the buffer line 203.

Further, regarding the definition of the depletion status of the processing systems 105, 108, and 111, for example, a state in which each of processing systems 105, 108, and 111 respectively holds 50% or more of the number of the sample carriers 100 held in an initial state is defined as a normal state, and a state in which the number of held sample carriers 100 is less than 50% is defined as a depletion state. The number of sample carriers 100 held in the initial state depends on the scale of the processing system, and the larger the scale of the processing system is, the larger the number of sample carriers 100 held by the processing system in the initial state is. As described above, when the sample carrier 100 is conveyed by the conveyance line 201 between each of the processing systems 105, 108, and 111, in order to maintain the constant number of the sample carriers 100 held in each of the processing systems, the empty sample carrier 100 is conveyed in the opposite direction by the empty sample carrier line 202. That is, the balance of the number of sample carriers 100 between the processing systems is broken when the number of empty sample carriers 100 conveyed in the opposite direction by the empty sample carrier line 202 is smaller than the number of sample carriers 100 conveyed on the conveyance line 201 between the processing systems. In the present embodiment, the number of the sample carriers 100 held by each of the processing systems 105, 108, and 111 is ascertained from the number of the sample carriers 100 conveyed between the processing systems 105, 108, and 111.

Next, details of the conveyance process by the control device 113 will be described.

In the conveyance process, firstly, the depletion status (the depletion state or the normal state) of each of the processing systems 105, 108, and 111 is determined. Similarly, the depletion status (the depletion state, the normal state, or the full state) of the buffer 115 held by each of the processing systems 105, 108, and 111 is also determined. Subsequently, a supply coefficient is determined based on the depletion status. The supply coefficient is used to calculate the number of sample carriers 100 to be supplied from the empty sample carrier line 202 of each of the processing systems 105, 108, and 111 to the buffer line 203 or another adjacent processing system, and is determined based on the depletion status from a supply coefficient table stored in the control device 113.

FIG. 4 is a diagram showing an example of the supply coefficient table.

In FIG. 4, the supply coefficient is determined based on the depletion status of a certain processing system (referred to as an own system), the depletion status of the buffer line 203 (the buffer 115) of the own system, and the depletion status of another processing system adjacent to the own system (referred to as an adjacent system). For example, when determining a supply coefficient related to the supply of the sample carrier 100 from the own system to the adjacent system, in a case where the own system is in the normal state, the supply coefficient is determined to be 6 when the adjacent system is in the depletion status, and the supply coefficient is determined to be 3 when the adjacent system is in the normal state. Further, in a case where the own system is in the depletion state, the supply coefficient is determined to be 3 when the adjacent system is in the depletion state, and it is determined not to supply (that is, the sample carrier 100 is not supplied to the adjacent system) when the adjacent system is in the normal state.

In addition, when determining a supply coefficient related to the supply of the sample carrier 100 from the own system to the buffer line 203, the supply coefficient is determined to be 2 when the buffer line 203 of the own system is in the depletion state, the supply coefficient is determined to be 1 when the buffer line 203 of the own system is in the normal state, and it is determined not to supply (that is, the sample carrier 100 is not supplied to the buffer line 203) when the buffer line 203 of the own system is in the full state. Further, in a case where the own system is in the normal state, the supply coefficient is determined to be 1 when the state of the buffer line 203 is the depletion state, and it is determined not to supply when the state of the buffer line 203 is the normal state or the full state.

Here, supply distribution for each supply destination is determined by using the supply coefficient determined for each supply destination of the empty sample carrier 100. The supply distribution indicates a ratio of the number of sample carriers 100 to be supplied to the buffer line 203 or the adjacent system to the number of sample carriers 100 circulating in the empty sample carrier line 202 of the own system. The supply distribution is determined by substituting supply coefficients into the following (Equation 1).

$$\text{supply distribution} = \text{(supply coefficient of certain supply destination)}/\text{(sum of supply coefficients of all destinations}+1) \quad \text{(Equation 1)}$$

The sample carriers 100 circulating in the empty sample carrier line 202 of the own system is supplied to the buffer line 203 or the adjacent system according to the distribution determined by the (Equation 1). When the supply distribution is determined by the above (Equation 1), it can be ensured that 1/(sum of supply number of all supply destinations+1) sample carriers 100 are circulating on the empty sample carrier line 202, so that even an urgent supply request of empty sample carriers 100 from the buffer line 203 can be dealt with immediately.

The operation in the present embodiment configured as described above will be described.

FIG. 5 is a diagram showing an example of the conveyance process. In FIG. 5, two processing systems are illustrated, and a manner of conveying the sample carriers 100 is shown. Further, in FIG. 5, the recycle line or the like is not shown.

As shown in FIG. 5, an own system. 501 includes four buffer lines 503 to 506 and is adjacent to an adjacent system 502. The depletion status of the buffer line 503 is the normal state, the buffer lines 504 and 506 are in the full state, and the buffer line 505 is in the depletion state. It is also assumed that the adjacent system 502 is in the depletion state and the own system 501 is in the normal state.

In this case, a supply coefficient for a supply of the sample carriers 100 from the empty sample carrier line 202 of the own system 501 to each supply destination is determined based on a supply coefficient table (FIG. 4) as follows.

(supply destination): (supply coefficient)
buffer line 503: 1
buffer line 504: not supply
buffer line 505: 2
buffer line 506: not supply
adjacent system 502: 6

The supply distribution is determined by using (Equation 1) based on the above supply coefficients, and it is determined that, of the empty sample carriers 100 circulating in the empty sample carrier line 202 of the own system 501, 1/10 is supplied to the buffer line 503, 1/5 is supplied to the buffer line 505, 3/5 is supplied to the adjacent system 502 respectively, and 1/10 is kept circulating in the empty sample carrier line 202 of the own system 501.

FIG. 6 is a diagram showing an example of a conveyance process in a larger-scale processing system. In FIG. 6, four processing systems 601 to 604 are illustrated, and a manner of conveying the sample carriers 100 is shown.

As shown in FIG. 6, an own system 601 includes three buffer lines (buffer) 605 to 607 and is adjacent to adjacent systems 602 to 604. Here, it is assumed that the depletion status of the buffer line 605 is the normal state, the buffer line 606 is in the full state, the buffer line 607 is in the depletion state, the adjacent system 602 is in the depletion state, the adjacent system 603 is in the normal state, the adjacent system 604 is in the normal state, and the own system 601 is in the depletion state.

In this case, a supply coefficient for a supply of the sample carriers 100 from an empty sample carrier line of the own system 601 to each supply destination is determined based on a supply coefficient table (FIG. 6) as follows.

(supply destination): (supply coefficient)
buffer line 605: not supply
buffer line 606: not supply
buffer line 607: 1
adjacent system 602: 3
adjacent system 603: not supply
adjacent system 604: not supply The supply distribution is determined by using (Equation 1) based on the above supply coefficients, and it is determined that, of the empty sample carriers 100 circulating in the empty sample carrier line of the own system 601, 1/5 is supplied to the buffer line 607, 3/5 is supplied to the adjacent system 602, and 1/5 is kept circulating in the empty sample carrier line of the own system 601.

The effects of the present embodiment configured as described above will be described.

In the related art, a sample rack acquisition ratio for a plurality of processing units configuring an automated sample inspection system is determined based on the number of processing units in need of a supply of an empty sample rack and an order in which empty sample racks arrived. However, a processing speed and a processing status are different in each processing unit, and the number of required empty sample racks and a priority are also different for each processing unit. Thus, it is impossible to properly control the number and a conveyance destination of sample racks to be conveyed, and depletion of the sample racks is not suppressed sufficiently. Further, in the other related art, empty racks are mutually supplied between a plurality of systems connected by the connection unit as needed. However, how to supply the empty racks are not disclosed and depletion of the sample racks is not suppressed sufficiently.

In contrast, the automated sample inspection system in the present embodiment includes a plurality of processing systems 105, 108, and 111 which are arranged adjacently to each other, and each including one or more processing units that perform processing according to an analysis of a sample, and the automated sample inspection system is provided with a conveyance line 201 that can convey sample containers 100a accommodating samples and mounted on sample carriers 100 in each of the processing systems and to another adjacent processing system; an empty sample carrier line 202 that can hold while conveying empty sample carriers 100 on which the sample container 100a is not mounted in each of the processing systems and convey to another adjacent processing system; and a buffer line 203 that temporarily holds empty sample carriers 100 to be supplied from the empty sample carrier line 202 to the conveyance line 201. The number of the empty sample carriers 100 to be conveyed from the empty sample carrier line 202 to the buffer line 203 of each processing system and the number of the empty sample carriers 100 to be conveyed from the empty sample carrier line 202 of each processing system to the empty sample carrier line 202 of another adjacent processing system are determined in accordance with the depletion status of the empty sample carriers 100 held in the buffer line 203 of each processing system, and the depletion status of the empty sample carriers 100 held by another processing system adjacent to each processing system. Therefore, delays in processes in the system can be suppressed due to the suppression of depletion of the sample carriers.

That is, in the present embodiment, more empty sample carriers 100 are supplied to a supply destination in the depletion state, so that the delays in the process due to the depletion of the sample carriers 100 is less likely to occur in the processing unit. Further, in a state where the balance of the empty sample carriers 100 with the adjacent system is broken, the empty sample carriers 100 cannot be appropriately supplied to the buffer line in the adjacent system, and thus, empty sample carriers 100 are preferentially supplied to the adjacent system so that the empty sample carriers 100 can be more appropriately supplied to the buffer line 203 in the adjacent system.

The invention is not limited to examples described in the above-described embodiment and includes various modifications. That is, the above-described embodiments have been described in detail in order to make the invention easy to understand, and not necessarily limited to those which have all of the described configurations. Further, in the present embodiment, the combination of each processing function part included in the automated sample inspection system is shown as an example, and various modifications are possible depending on the scale and operation method.

REFERENCE SIGN LIST

100 sample carrier
100a sample container
101 feeding unit
102 centrifugal unit
103 labeler
104 dispensing unit
105 processing system
106 conveyance unit
107 transfer unit
108 processing system
109 plugging unit
110 storage unit
111 processing system
112 connection unit
113 control device
114 analysis device
115 buffer
201 conveyance line
202 empty sample carrier line
203 (203a to 203d) buffer line
204 (204a to 204d) recycle line
301 (301a to 301d) sample carrier detection sensor
501 own system
502 adjacent system
503 to 506 buffer line (buffer)
601 own system (processing system)
602 to 604 adjacent system (processing system)
605 to 607 buffer line (buffer)

The invention claimed is:

1. An automated sample inspection system that includes a plurality of processing systems which are arranged adjacently to each other and each including one or more processing units that perform processing according to an analysis of a sample, the automated sample inspection system comprising:
a conveyance line that is able to convey sample containers accommodating samples and mounted on sample carriers in each of the processing systems and convey the sample containers to at least one other adjacent processing system of the plurality of processing systems;
at least one empty sample carrier line that is able to hold empty sample carriers while conveying them on which the sample containers are not mounted in each of the processing systems and convey the empty sample carriers to at least one other adjacent processing system of the plurality of processing systems;
at least one buffer line in each of the plurality of processing systems that temporarily holds the empty sample carriers supplied from the empty sample carrier line to the conveyance line; and
a control device configured to:
determine a number of empty sample carriers to be conveyed from the empty sample carrier line to the buffer line of each of the processing systems in accordance with a depletion status of empty sample carriers held in the buffer line of each of the processing systems, and a number of empty sample carriers to be conveyed from the empty sample carrier line of each of the processing systems to the empty sample carrier line of another adjacent processing system in accordance with a depletion status of empty sample carriers held by another processing system adjacent to each respective processing system,
determine at least one supply coefficient for each of the processing systems based on a depletion status of empty sample carriers held in the empty sample carrier line of each of the processing systems, the depletion status of empty sample carriers held in the buffer line of each of the processing systems, and the depletion status of empty sample carriers held by another processing system adjacent to each of the processing systems,
calculate a supply distribution of empty sample carriers to be conveyed from the empty sample carrier line of each of the processing systems as a ratio of a supply coefficient of the empty sample carrier line of each of the processing systems to a value which is formed from a sum of supply coefficients of the buffer line of each of the processing systems and another processing system adjacent to each of the processing systems plus one, and
convey the empty sample carriers from the at least one empty sample carrier line to at least one other adjacent processing system of the plurality of processing systems according to the calculated supply distribution.

2. A method for controlling an automated sample inspection system that includes a plurality of processing systems which are arranged adjacently to each other and each including one or more processing units that perform processing according to an analysis of a sample, a conveyance line that is able to convey sample containers accommodating samples and mounted on sample carriers in each of the processing systems and convey the sample containers to another adjacent processing system, at least one empty sample carrier line that is able to hold empty sample carriers while conveying them on which the sample container is not mounted in each of the processing systems and convey the empty sample carriers to another adjacent processing system, and at least one buffer line that temporarily holds the empty sample carriers supplied from the empty sample carrier line to the conveyance line, the method comprising:
detecting a depletion status of empty sample carriers held in the buffer line of each of the processing systems, and a depletion status of empty sample carriers held by another processing system adjacent to each of the processing systems;

determining at least one supply coefficient for each of the processing systems based on a depletion status of empty sample carriers held in the empty sample carrier line of each of the processing systems, the depletion status of empty sample carriers held in the buffer line of each of the processing systems, and the depletion status of empty sample carriers held by another processing system adjacent to each of the processing systems and calculating a supply distribution of empty sample carriers to be conveyed from the empty sample carrier line of each of the processing systems as a ratio of a supply coefficient of the empty sample carrier line of each of the processing systems to a value which is formed from a sum of supply coefficients of the buffer line of each of the processing systems and another processing system adjacent to each of the processing systems plus one; and conveying the empty sample carriers from the at least one empty sample carrier line to at least one other adjacent processing system of the plurality of processing systems according to the calculated supply distribution.

* * * * *